(12) United States Patent
Wang et al.

(10) Patent No.: US 7,433,717 B2
(45) Date of Patent: Oct. 7, 2008

(54) METHOD AND SYSTEM FOR MANAGING MULTIPLE COMMUNICATION FUNCTIONS IN A MOBILE VEHICLE COMMUNICATION UNIT

(75) Inventors: Mingheng Wang, Rochester Hills, MI (US); Edward P. Chrumka, Grosse Pointe Park, MI (US); Christopher L. Oesterling, Troy, MI (US)

(73) Assignee: General Motors Corporation, Detroit, MI (US)

( * ) Notice: Subject to any disclaimer, the term of this patent is extended or adjusted under 35 U.S.C. 154(b) by 460 days.

(21) Appl. No.: 10/996,626

(22) Filed: Nov. 23, 2004

(65) Prior Publication Data

US 2006/0111140 A1    May 25, 2006

(51) Int. Cl.
*H04M 1/00*    (2006.01)
(52) U.S. Cl. .................. 455/569.2; 455/556.1; 455/557
(58) Field of Classification Search .............. 455/556.1, 455/556.2, 557, 569.2, 414.1, 420; 701/1, 701/2, 36, 49
See application file for complete search history.

(56) References Cited

U.S. PATENT DOCUMENTS

| | | | | |
|---|---|---|---|---|
| 5,758,300 A | * | 5/1998 | Abe | 455/424 |
| 6,014,566 A | * | 1/2000 | Owada | 455/444 |
| 6,028,537 A | * | 2/2000 | Suman et al. | 340/988 |
| 6,032,050 A | * | 2/2000 | Hasegawa | 455/517 |
| 6,084,870 A | * | 7/2000 | Wooten et al. | 370/349 |
| 6,330,499 B1 | * | 12/2001 | Chou et al. | 701/33 |
| 6,340,928 B1 | * | 1/2002 | McCurdy | 340/436 |
| 6,560,517 B2 | * | 5/2003 | Matsui | 701/33 |
| 6,757,262 B1 | * | 6/2004 | Weisshaar et al. | 370/310 |
| 6,892,065 B2 | * | 5/2005 | Reeser | 455/413 |
| 6,983,171 B2 | * | 1/2006 | Van Bosch et al. | 455/557 |
| 7,093,006 B2 | * | 8/2006 | Sanjeev et al. | 709/220 |
| 7,174,149 B2 | * | 2/2007 | Chin et al. | 455/403 |
| 7,218,925 B2 | * | 5/2007 | Crocker et al. | 455/419 |

OTHER PUBLICATIONS

U.S. Appl. No. 10/846,237, filed May 14, 2004, Wang, et al.

* cited by examiner

*Primary Examiner*—Sonny Trinh (57) ABSTRACT

A method of managing multiple communication functions in a mobile vehicle is provided. A communication request signal is received from the mobile vehicle at a call status intelligence module. The communication status of a telematics unit is determined. A communication function is executed via the telematics unit in response to the determined communication status. A system and a program for managing multiple communication functions in a mobile vehicle are also provided.

9 Claims, 6 Drawing Sheets

METHOD AND SYSTEM FOR MANAGING MULTIPLE COMMUNICATION FUNCTIONS IN A MOBILE VEHICLE COMMUNICATION UNIT

FIELD OF THE INVENTION

This invention relates generally to operating a mobile vehicle communication system. Specifically, the invention relates to a method and system for managing multiple communication functions with a single button in a mobile vehicle communication unit.

BACKGROUND OF THE INVENTION

Voice-operated mobile communication units are known in the art. These units are capable of managing several communication functions in a "hands-free" manner. The user issues a first voice command corresponding to a first communication function (e.g. "Power on") and may then issue another voice command corresponding to a different communication function (e.g. "Answer call").

In certain traffic situations, however, it is desirable to provide an alternative to voice operation for managing communication functions. One such traffic situation is an area of high background noise (for example, a tunnel). Such an alternative would be mostly hands-free but could operate even when voice operation is compromised. Such an alternative method would also be capable of being used interchangeably with a voice-operated system depending on the noise environment. In some instances, this alternative method could be available when the mobile vehicle is stationary and the voice-operated hands-free method when the vehicle is moving.

Accordingly, it would be desirable to have a system and method for managing multiple communication functions in a mobile vehicle communication system using a single button. It would further be desirable to have a system and method for operating a mobile vehicle communication unit that is subscribed to a mobile vehicle communication network. It is an object of this invention, therefore, to provide alternative systems and methods for managing multiple communication functions to those described above.

SUMMARY OF THE INVENTION

One aspect of the invention is a method for managing multiple communication functions in a mobile vehicle. A communication request signal from the mobile vehicle is received at a call status intelligence module (CSIM), prompting the CSIM to determine a communication status of a telematics unit. A communication function is then executed via the telematics unit in response to the determined communication status. A function assignment, corresponding to the communication function, may also be sent from the CSIM based on the determined communication status. The communication function may be, for example, to wake the telematics unit, to answer an incoming call, to receive alphanumeric data, to send an outgoing call, or to end an active call.

Another aspect of the invention is a system for managing multiple communication functions in a mobile vehicle. The system includes means for receiving a communication request signal from the mobile vehicle at a call status intelligence module (CSIM), means for determining a communication status of a telematics unit and means for executing the communication function via the telematics unit in response to the determined communication status. The system further comprises means for sending a function assignment, corresponding to the communication function, from the CSIM based on the determined communication status. The system further include means for waking the telematics unit, means for answering an incoming call, means for receiving alphanumeric data, means for sending an outgoing call and means for ending an active call.

Yet another aspect of the present invention comprises a computer usable medium including a program for managing multiple communication functions in a mobile vehicle. The program includes code that receives a communication request signal from the mobile vehicle at a call status intelligence module (CSIM), code that determines a communication status of a telematics unit and code that executes the communication function via the telematics unit in response to the determined communication status. The program further includes code that sends a function assignment, corresponding to the communication function, from the CSIM based on the determined communication status. The program further includes code that wakes the telematics unit, code that answers an incoming call, code that receives alphanumeric data, code that sends an outgoing call and code that ends an active call.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
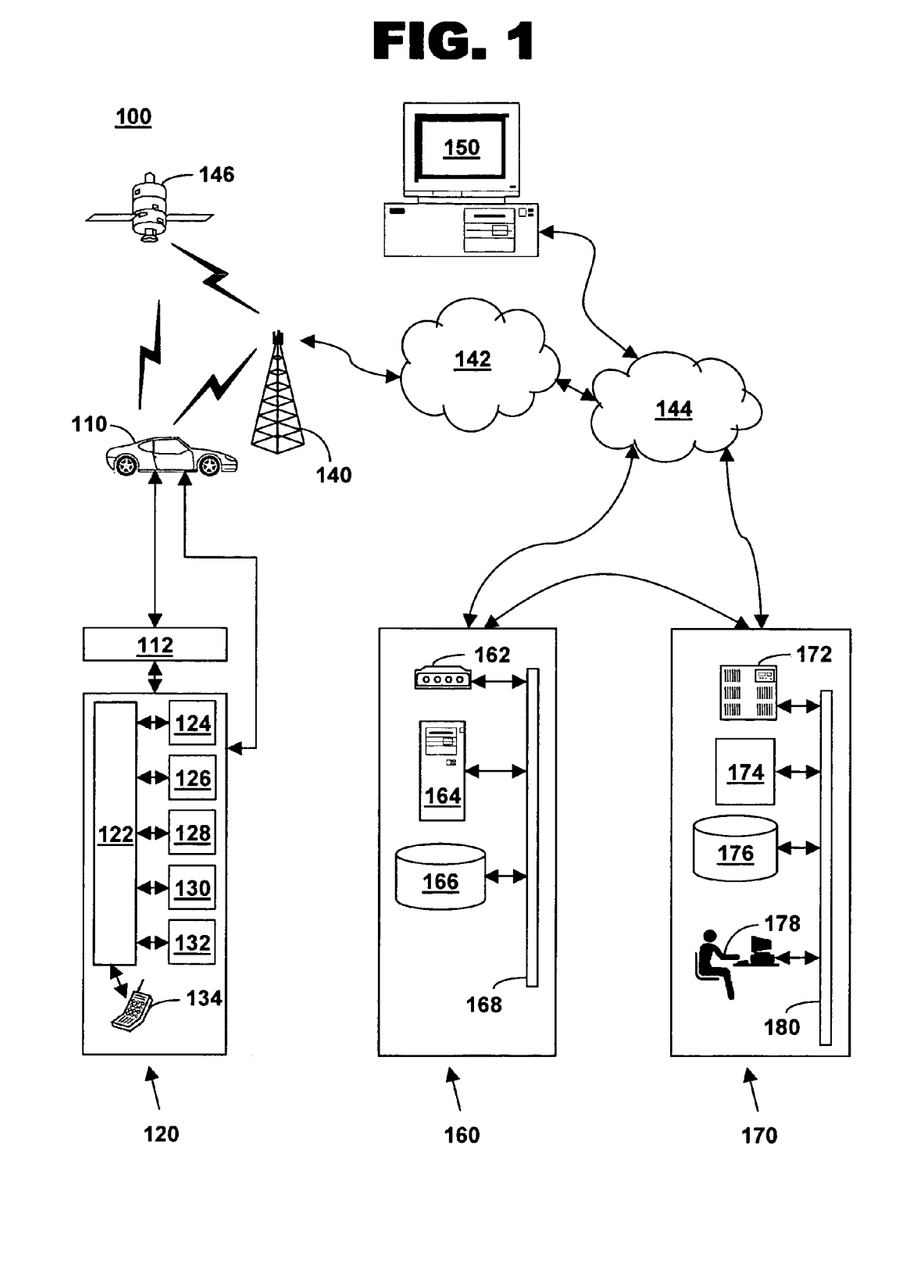
FIG. 1 illustrates a mobile vehicle communication system for managing multiple communication functions in a mobile vehicle communication unit, in accordance with one embodiment of the present invention.

FIG. 1 illustrates one embodiment of a mobile vehicle communication system (MVCS) 100 for controlling vehicle modules. MVCS 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more vehicle call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, activating a remote alert (e.g. honking the horn and/or flashing the lights), setting personal comfort settings, and calling from telematics unit 120. These functions are performed by sending electronic instructions to a vehicle module configured to perform a certain task or function. In facilitating interactions among the various communication and electronic modules, vehicle communication network 112 utilizes network interfaces such as controller-area network, International Organization for Standardization (ISO) Standard 9141, ISO Standard 11898 for high-speed applications, ISO Standard 11519 for lower speed applications, and Society of Automotive Engineers Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142. MVCU 110 may also send and receive digital satellite content from satellite broadcast system 146.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In another embodiment, processor 122 is implemented as an application-specific integrated circuit. In another embodiment, processor 122 is implemented as a processor working in conjunction with a central processing unit performing the function of a general-purpose processor. In one embodiment of the invention, processor 122 is implemented as a module able to monitor and process the status of a call to be received by the keypad of the present invention.

GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone. In one embodiment, the keypad and/or multiple function button of the present invention may be implemented in phone 134.

Processor 122 executes various computer programs that control programming and operational modes of electronic and mechanical systems within MVCU 110. Processor 122 controls communications (e.g., call signals) between telematics unit 120, wireless carrier system 140, and vehicle call center 170. Additionally, processor 122 controls reception of communications from satellite broadcast system 146.

In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate programming modes and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signals over part of or the entire communication path. Wireless carrier system 140 may be implemented as any type of broadcast communication in addition to satellite broadcast system 146. Alternatively, wireless carrier system 140 may provide broadcast communication to satellite broadcast system 146 for download to MVCU 110. For example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. For example, satellite broadcast system 146 may broadcast over a spectrum in the "S" band of 2.3 GHz that has been allocated by the U.S. Federal Communications Commission for nationwide broadcasting of satellite-based Digital Audio Radio Service (SDARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by vehicle call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to computer 150, web-hosting portal 160, and vehicle call center 170. In one embodiment, land network 144 is a public-switched telephone network. In another embodiment, land network 144 is implemented as an Internet protocol (IP) network. In other embodiments, land network 144 is implemented as a wired network, an optical network, a fiber network, a wireless network, or a combination thereof. Land network 144 is connected to one or more landline telephones.

Communication network 142 and land network 144 connect wireless carrier system 140 to web-hosting portal 160 and vehicle call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol, or transport-control protocol and Internet protocol. In one embodiment, the data includes directives to change certain programming and operational modes of electronic and mechanical systems within MVCU 110.

In operation, a client utilizes computer 150 to initiate setting or re-setting of user preferences for MVCU 110. Thus, the client may be able to initiate settings for the use of the keypad or multiple-function button of the present invention. For example, the client may set the multi-function button to be available only when the mobile vehicle is stationary, e.g. set the multi-function button to be available when the steering wheel is locked or when the vehicle is powered off. The client may also program what functions are to be managed by the multiple-function button, e.g. "call waiting", "power on", etc.

User-preference data from client-side software is transmitted to server-side software of web-hosting portal 160. In an example, user-preference data is stored at web-hosting portal 160. Web-hosting portal 160 includes one or more data modems 162, one or more web servers 164, one or more databases 166, and a network system 168. Web-hosting portal 160 is connected directly by wire to vehicle call center 170, or connected by phone lines to land network 144, which is connected to vehicle call center 170. In an example, web-hosting portal 160 is connected to vehicle call center 170 utilizing an IP network. In this example, both components, web-hosting portal 160 and vehicle call center 170, are connected to land network 144 utilizing the IP network. In another example, web-hosting portal 160 is connected to land network 144 by one or more data modems 162. Land network 144 sends digital data to and receives digital data from data modem 162, data that is then transferred to web server 164. Data modem 162 may reside inside web server 164. Land network 144 transmits data communications between web-hosting portal 160 and vehicle call center 170.

Web server 164 receives user-preference data from user computer 150 via land network 144. Computer 150 may include a wireless modem to send data to web-hosting portal 160 through a wireless communication network 142 and a land network 144. Data is received by land network 144 and sent to one or more web servers 164. Web server 164 may be implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. Web server 164 may also include computer applications and files for managing preferences regarding the multiple-function button of the present invention. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to vehicle call center 170 through land network 144.

Vehicle call center 170 is a location where many calls are received and serviced at the same time, or where many calls are sent at the same time. In one example, the call center is a telematics call center, facilitating communications to and from telematics unit 120 in MVCU 110. In another example, the call center is a voice call center, providing verbal communications between an advisor in the call center and a subscriber in a mobile vehicle. In another example, the call center contains each of these functions. In other embodiments, vehicle call center 170 and web-hosting portal 160 are located in the same or different facilities.

Vehicle call center 170 contains one or more voice and data switches 172, one or more communication services managers 174, one or more communication services databases 176, one or more communication services advisors 178, and one or more network systems 180.

Switch 172 of vehicle call center 170 connects to land network 144. Switch 172 transmits voice or data transmissions from vehicle call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, communications assistance and DSC management. Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

Communication services advisor 178 may be implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from vehicle call center 170. In one embodiment, the call is routed to telematics unit 120 from vehicle call center 170 via land network 144, communication network 142, and wireless carrier system 140. In another embodiment, an outbound communication is routed to telematics unit 120 from vehicle call center 170 via land network 144, communication network 142, wireless carrier system 140, and satellite broadcast system 146. In this embodiment, an inbound communication is routed to vehicle call center 170 from telematics unit 120 via wireless carrier system 140, communication network 142, and land network 144.

Figure 2A:
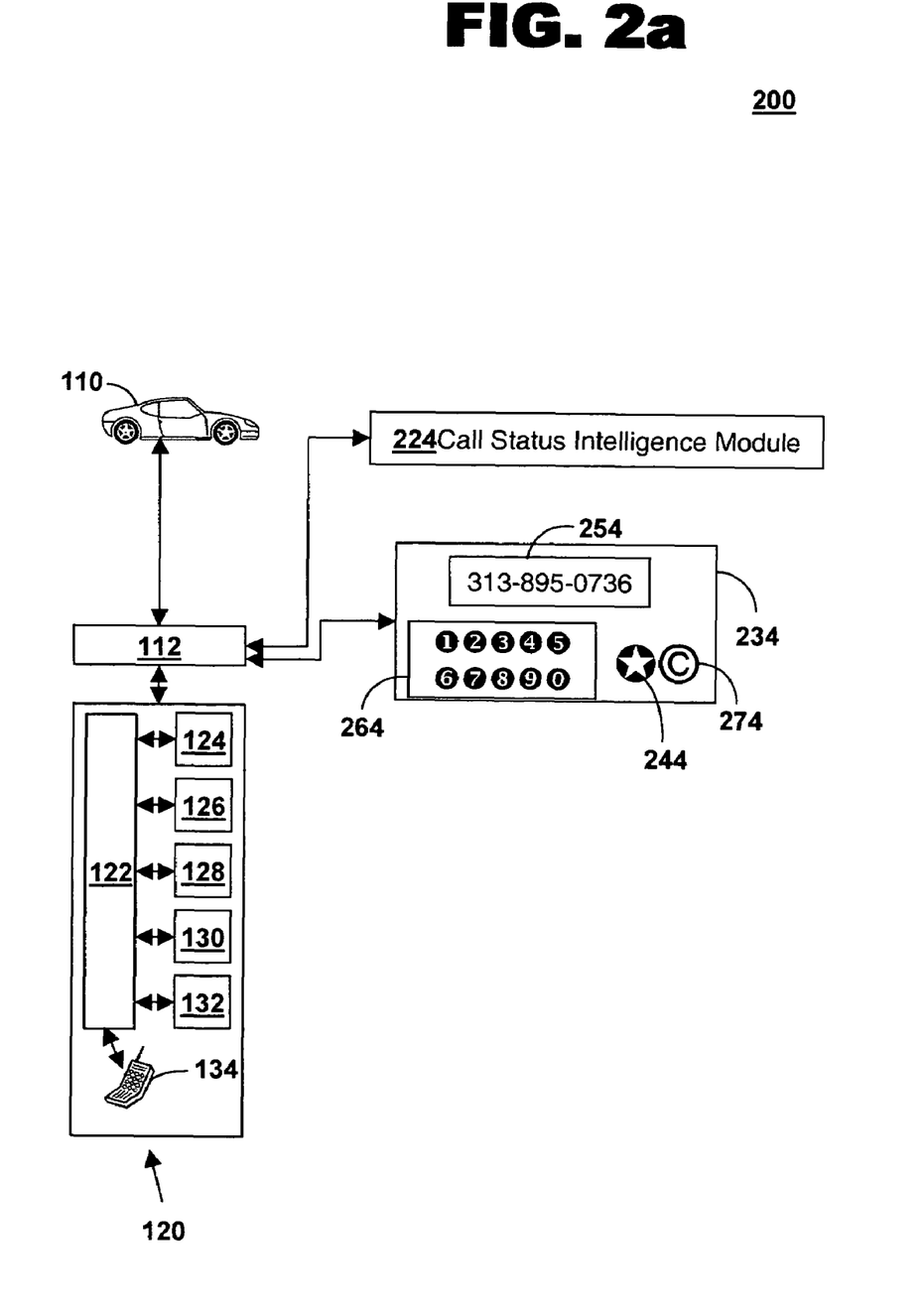
FIG. 2a illustrates a keypad and communication status intelligence unit for managing multiple communication functions in a mobile vehicle communication unit in accordance with one embodiment of the present invention.
Figure 2B:
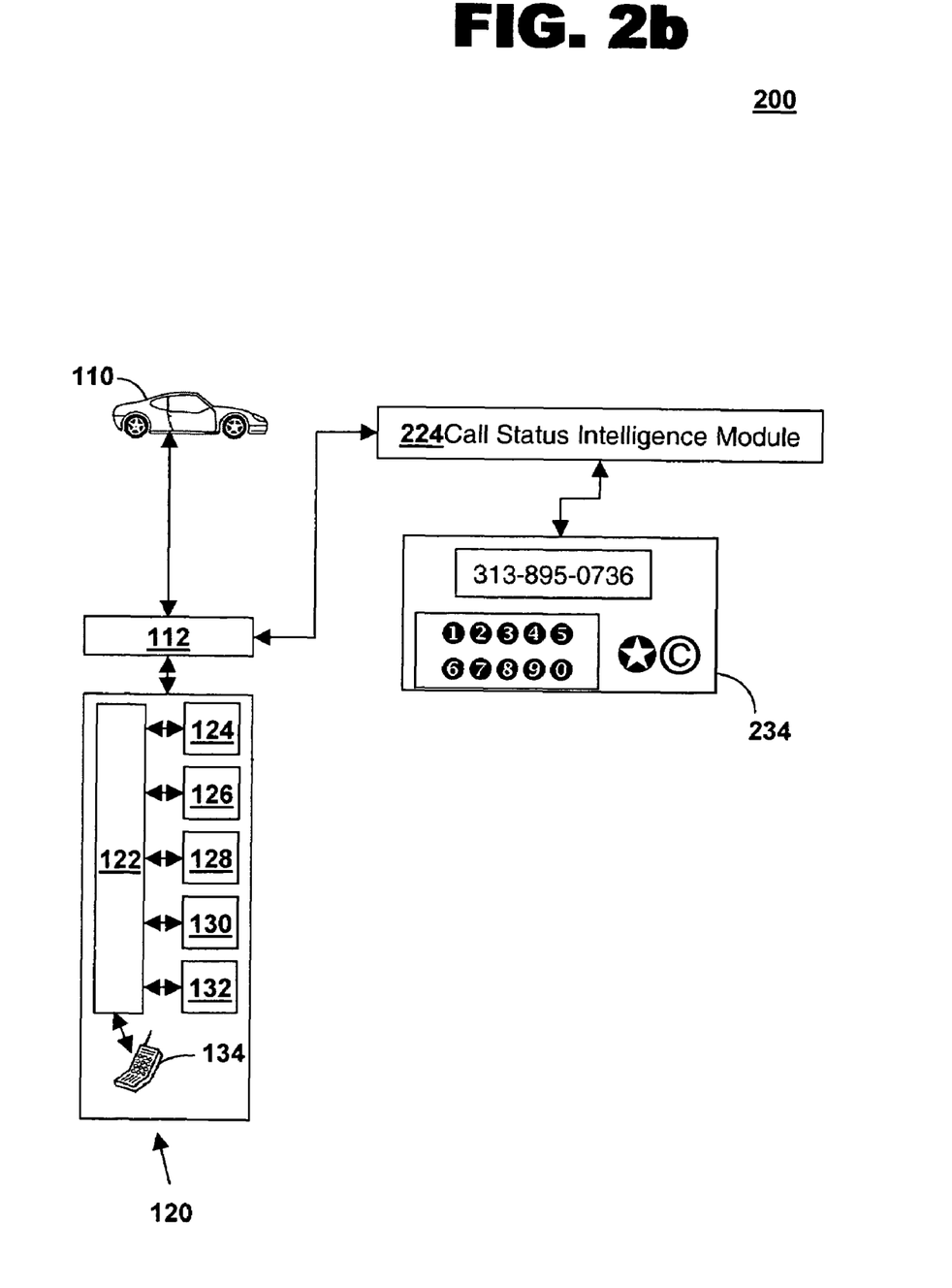
FIG. 2b illustrates a keypad and communication status intelligence unit for managing multiple communication functions in a mobile vehicle communication unit in accordance with a second embodiment of the present invention.
Figure 2C:
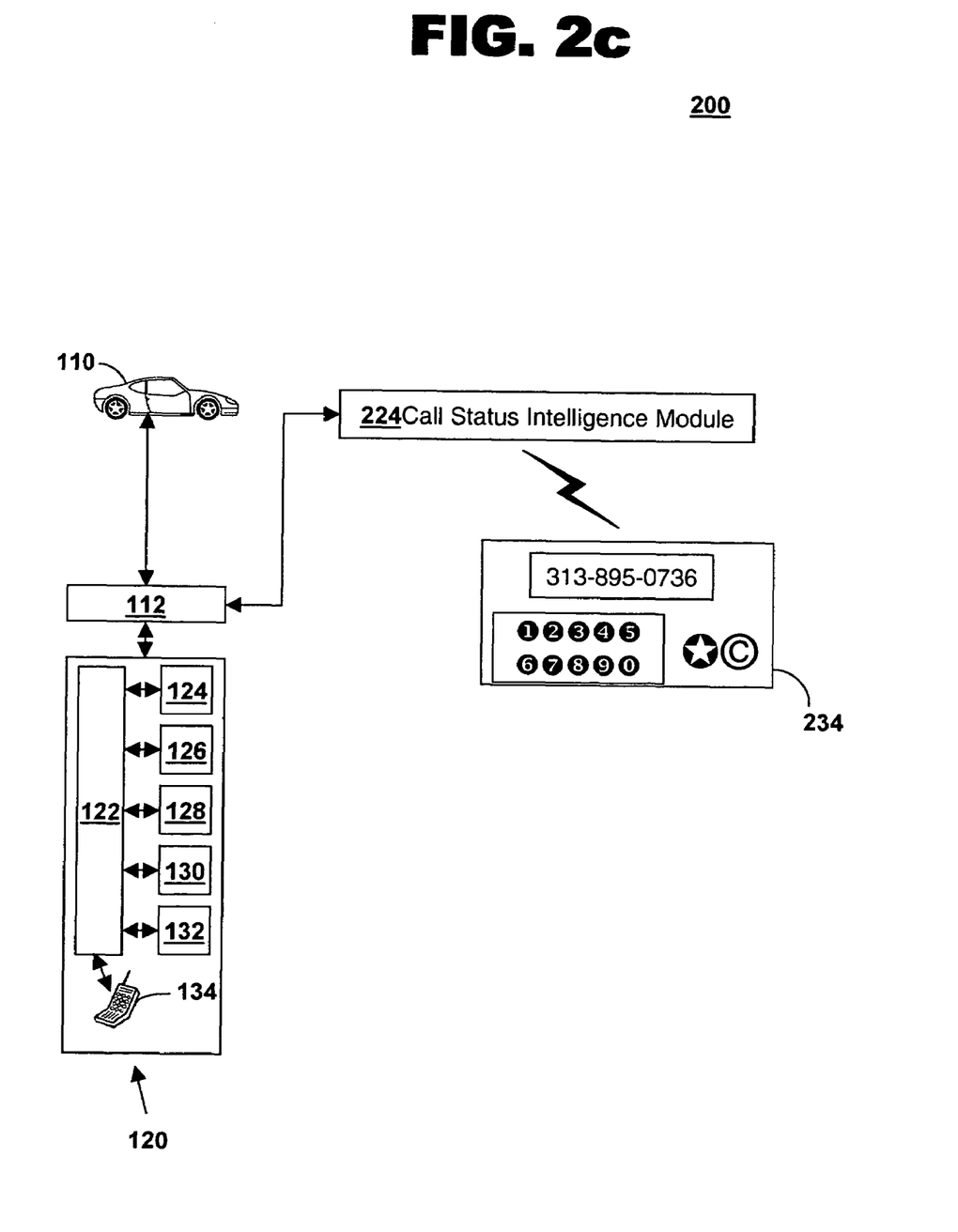
FIG. 2c illustrates a keypad and communication status intelligence unit for managing multiple communication functions in a mobile vehicle communication unit in accordance with a third embodiment of the present invention.

FIGS. 2a through 2c illustrate a communication function management (CFM) system 200 in accordance with another embodiment of the current invention. The components shown in FIGS. 2a through 2c may also be used in conjunction with one or more of the components of mobile vehicle communication system 100 above.

CFM system 200 includes a vehicle network 112 and telematics unit 120 as well as one or more of their separate components, as described above. Communication function management system 200 further comprises a call status intelligence module (CSIM) 224 and a keypad 234. Keypad 234 includes a multi-function button 244 and a visual display 254. Keypad 234 may further include one or more alphanumeric keys 264 as well as a clear button 274.

As seen in FIG. 2a, call status intelligence module (CSIM) 224 may be in wired communication with vehicle network 112 while keypad 234 is in wired communication with vehicle network 112. As seen in FIG. 2b, call status intelligence module (CSIM) 224 may be in wired communication with vehicle network 112 and in separate wired communication with keypad 234. As seen in FIG. 2c, call status intelligence module (CSIM) 224 may be in wired communication with vehicle network 112 while being in wireless communication with keypad 234. As FIG. 2b shows, CSIM 224 may be connected as one unit with keypad 234 or may be separate from keypad 234 as FIGS. 2a and 2c show.

CSIM 224 is any suitable processor for receiving and managing data from keypad 234 and from vehicle network 112 or telematics unit 120 and/or various components of telematics unit 120. CSIM 224 executes various computer programs that control programming and operational modes of electronic and mechanical systems within keypad 234. CSIM 224 controls communication functions (such as power supply and/or call signals) between keypad 234, vehicle network 112 and telematics unit 120. CSIM 224 may also control communication functions between wireless carrier system 140, and vehicle call center 170 as well as other components of system 100. In accordance with the present invention, CSIM 224 manages queries from keypad 234. CSIM 224 may receive information from keypad 234, vehicle network 112 and telematics unit 120. CSIM 224 may then determine the appropriate function for universal button 244 depending on the information received.

Keypad 234 is any suitable touch-sensitive device as is known in the art. In accordance with the present invention, keypad 234 comprises one or more touch-sensitive buttons, including multi-function button 244, as well as a visual display 254. Keypad 234 may be used to access CSIM 224 in accordance with the present invention. Keypad 234 may be managed using CSIM 224 such that any communication function performed by keypad 234 is first determined by CSIM 224.

Multi-function button 244 is any suitable touch-sensitive key as is known in the art. In accordance with the present invention, the communication function activated by depressing multi-function button 244 may vary depending on the information gathered and processed by CSIM 224. For example, depressing multi-function button 244 may cause the keypad 234 to power on or off. In another instance, depressing multi-function button 244 may cause the keypad 234 to switch from being voice-activated to being touch-activated and vice versa. In yet another instance, depressing multi-function button 244 may cause the keypad 234 to answer a call. In yet another instance, depressing multi-function button 244 may cause the keypad 234 to change from a first incoming call to another incoming call. In yet another instance, depressing multi-function button 244 may cause the keypad 234 to end a call.

Visual display 254 is any suitable device for displaying visual information to the client, such as a liquid-crystal display (LCD) or other screen.

Alphanumeric keys 264 are any combination of suitable alphabetic or numeric characters as are well known in the art. As seen in FIGS. 2a-2c, these keys are commonly the ten numeric characters 0 through 9 but any other characters or combinations of characters is possible. Depression of a specific alphanumeric key 264 causes entry of corresponding data into keypad 234 for processing by CSIM 224. Depression of an alphanumeric key 264 may also cause entry of corresponding data into keypad 234 for display on visual display 254. Thus, in accordance with the present invention, depressing the "1" alphanumeric key enters the value of "1" for processing to CSIM 224 as well as causing the figure "1" to appear on visual display 254.

Clear button 274 is any suitable touch-sensitive button as is known in the art. Clear button 274 is also managed by CSIM 224. Depression of clear button 274 clears data currently being entered into keypad 234 for processing by CSIM 224. Depression of clear button 274 may also clear corresponding data being displayed on visual display 254.

Figure 3:
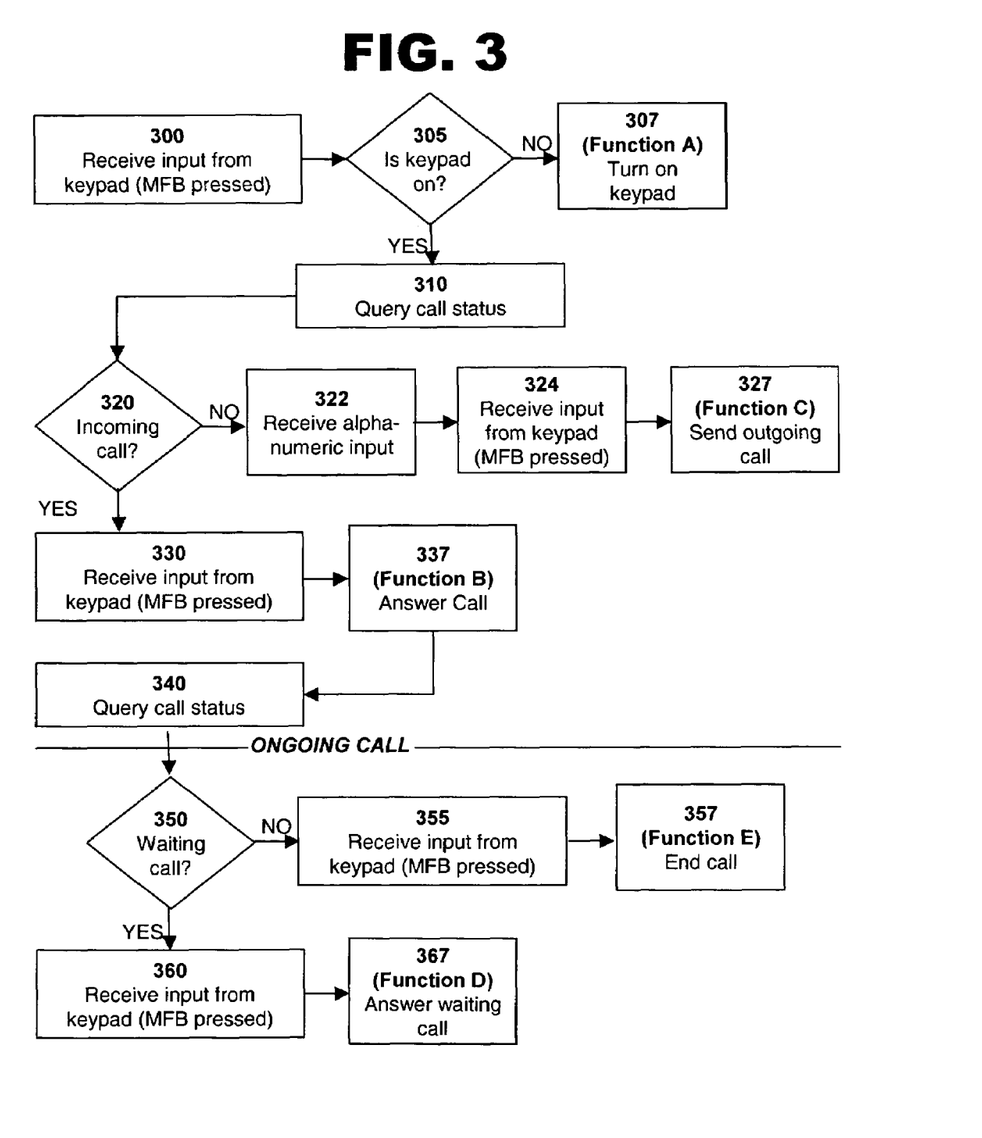
FIG. 3 illustrates a method of managing multiple communication functions in accordance with one embodiment of the present invention.

FIG. 3 illustrates a method of managing multiple communication functions in a mobile vehicle communication system in accordance with one embodiment of the current invention. Although the steps described in the method are shown in a given order, the steps are not limited to the order illustrated. In one embodiment of the invention, the method is accomplished only when the vehicle is stationary. In another embodiment of the invention, a voice-activated communication function management system is either manually turned off by the user or automatically turned off by MVCU 110 before the method of the present invention transpires.

As seen at block 300, once the multi-function button 244 on keypad 234 is pressed, CSIM 224 receives a signal indicating that the user wishes to have some sort of communication function performed.

As seen at block 305, CSIM 224 checks whether the keypad 234 is already on/activated. If the keypad is not powered on, CSIM 224 assigns a first function (Function A) to multi-function button 244, that of being a keypad activation button. CSIM 224 then proceeds to power on the keypad 234.

As seen at block 310, when the keypad 234 is on, CSIM 224 monitors the status of calls being managed by telematics unit 120.

As seen at block 320, CSIM 224 determines if an incoming call is being received by telematics unit 120. The incoming call is routed to telematics units 120 within mobile vehicle 110 from vehicle call center 170. The call may be routed to telematics unit 120 from vehicle call center 170 via land network 144, communication network 142, and wireless carrier system 140. CSIM 224 then alerts the user via keypad 224 that a call is incoming, for example by displaying "Incoming call" on visual display 254 or by a suitable sound as is known in the art.

As seen at block 330, once the multi-function button 244 on keypad 234 is pressed again, CSIM 224 receives a signal indicating that the user wishes to perform another communication function. CSIM 224 checks whether the incoming call has been put through to MVCU 110. If not, CSIM 224 assigns another function (Function B) to multi-function button 244, that of being a call answer button. CSIM 224 then proceeds to answer the incoming call as seen at block 337.

Returning to block 322, CSIM 224 may also receive input from keypad 234 via alphanumeric keys 264. Once input from the alphanumeric keys 264 has been entered, multi-function button 244 is pressed again (block 324) and CSIM 224 receives a signal indicating that the user wishes another communication function to be performed.

When button 244 has been pressed again at block 324, CSIM 224 checks whether alphanumeric data has been input to be used in making an outgoing call. If such data has been input, CSIM 224 assigns another function (Function C) to multi-function button 244 that of being a send call button. As seen at block 327, CSIM 224 then proceeds to send the call based on the alphanumeric input entered at block 322.

Returning to block 340, once a call has been answered, CSIM 224 continues to monitor or query the call status. During the ongoing active call, CSIM 224 can monitor for a second, incoming "waiting" call as shown at block 350.

When multi-function button 244 is pressed again (block 360), CSIM 224 receives a signal indicating that the user wishes another communication function to be performed. If at block 350, CSIM 224 determines there is a waiting call, CSIM 224 assigns yet another function (Function D) to multi-function button 244, that of being an answer call waiting button. CSIM 224 then proceeds to answer the second incoming call as seen at block 367.

Alternatively, if at block 350, CSIM 224 determines there is no further incoming call, upon the MFB keypress (block 355), CSIM 224 assigns yet another function (Function E) to multi-function button 244, that of being an end call button. CSIM 224 then proceeds to end the ongoing call as seen at block 357. In one embodiment of the invention, the button press which ends the active call also causes CSIM 224 to power off the keypad 234. In another embodiment of the invention, the powering-on of a voice-activated communication function management system occurs simultaneously with the powering off of the keypad 234.

Figure 4:
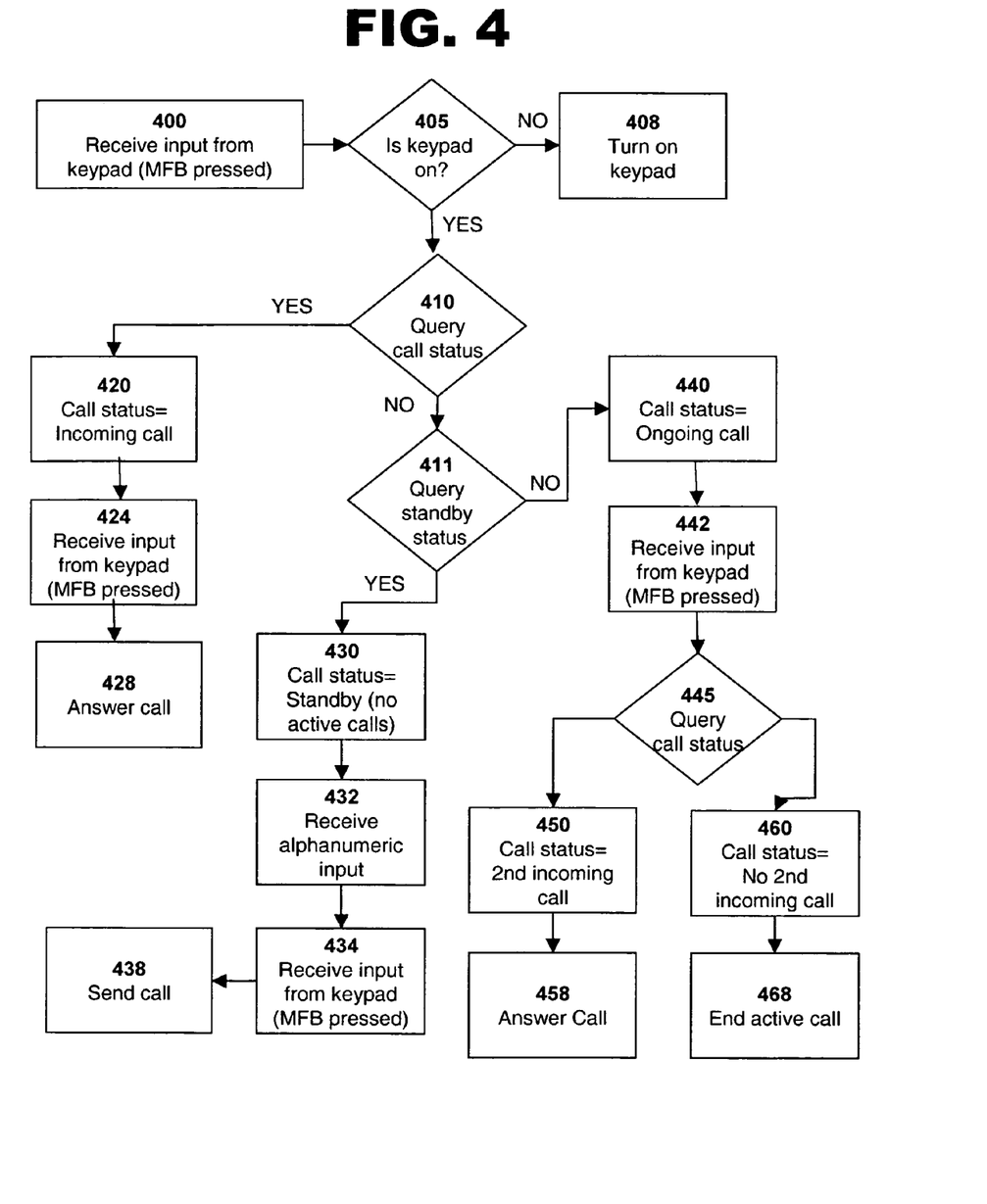
FIG. 4 illustrates a method of managing multiple communication functions in accordance with a second embodiment of the present invention.

FIG. 4 illustrates a method of managing multiple communication functions in a mobile vehicle communication system in accordance with another embodiment of the current invention. Although the steps described in the method of FIG. 4 are shown in a given order, the steps are not limited to the order illustrated. In one embodiment of the invention, the method is accomplished only when the vehicle is stationary. In another embodiment of the invention, a voice-activated communication function management system is either manually turned off by the user or automatically turned off by MVCU 110 before the method of FIG. 4 transpires.

As seen at block 400, once the multi-function button 244 on keypad 234 is pressed, CSIM 224 receives a signal indicating that the user wishes to have some sort of communication function performed.

As seen at block 405, CSIM 224 checks whether the keypad 234 is already on/activated. If the keypad is not powered on, CSIM 224 proceeds to power on the keypad 234 at block 408.

As seen at block 410, when the keypad 234 is on, CSIM 224 determines the status of calls being managed by telematics unit 120. Such calls may be routed to telematics units 120 within mobile vehicle 110 from vehicle call center 170. Such calls may be routed to telematics unit 120 from vehicle call center 170 via land network 144, communication network 142, and wireless carrier system 140.

As seen at block 410, CSIM 224 determines whether the call status an incoming call (block 420). As seen at block 424, once the multi-function button 244 on keypad 234 is pressed, CSIM 224 receives a signal indicating that the user wishes to have a communication function performed. CSIM 224 proceeds to answer the incoming call at block 428.

Alternatively, as seen at block 411, a test is performed to determine a call status standby condition wherein CSIM 224 determines the call status standby condition in which there are no active calls (block 430). In this condition, CSIM 224 may receive alphanumeric data (block 432) that may be used in making an outgoing call. If such data has been input, once the multi-function button 244 on keypad 234 is pressed at block 434, CSIM 224 receives a signal indicating that the user wishes to have a communication function performed. At block 438, CSIM 224 proceeds to send the outgoing call based on the alphanumeric data.

In another alternative, as seen at block 440, CSIM 224 determines the call status indicates an ongoing (active) call. As seen at block 442, once the multi-function button 244 on keypad 234 is pressed, CSIM 224 receives a signal indicating that the user wishes to have a communication function performed. CSIM 224 then proceeds to query the call status yet again as seen at block 445. A test is performed at block 445 to determine whether the call status indicates a second incoming call or no second incoming call.

As seen at block 450, CSIM 224 may then determine that there is a second, incoming "waiting" call. CSIM 224 then proceeds to answer the second incoming call as seen at block 458.

Alternatively, as seen at block 460, CSIM 224 may determine there is no further incoming call. In this case, CSIM 224 then proceeds to end the ongoing active call as seen at block 468. In one embodiment of the invention, CSIM 224 powers off the keypad 234 with the end of the call at block 468. In another embodiment of the invention, the powering-on of a voice-activated communication function management system occurs simultaneously with the powering off of the keypad 234.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of controlling multiple communications functions in a vehicle, the method comprising:
   (a) carrying out a telephone call using the telematics unit and a button accessible to a user within the vehicle;
   (b) associating different communication functions with the button at different times during the call based at least in part on the status of the telephone call, wherein the communication functions are used by the telematics unit to control the telephone call, and wherein the button has associated with it only one of the communication functions at a time; and
   (c) in response to activation of the button, determining the communication function currently associated with the button and carrying out that communication function for the telephone call.

2. The method of claim 1, wherein the button is located on a keypad that communicates with the vehicle via a wired connection or a short-range wireless link.

3. The method of claim 1, further comprising the step of presenting a message associated with the communication function.

4. The method of claim 3, wherein the presenting step further comprises displaying the message on a display associated with the button.

5. The method of claim 1, wherein step (c) is carried out at least in part using a call status intelligence module.

6. The method of claim 1, wherein the communication functions include initiating a call, answering a call, placing a call on hold, switching between calls, and ending a call.

7. A system for controlling multiple communications functions in a vehicle, comprising:
   a vehicle telematics unit that enables a vehicle occupant to send and receive voice telephone calls to and from the vehicle;
   a keypad at the vehicle that is in communication with the telematics unit and that has a multi-function button; and
   a call status intelligence module (CSIM) in communication with the keypad and telematics unit, wherein the CSIM receives signals from the multi-function button on the keypad and monitors the status of voice calls handled by the telematics unit, and wherein the CSIM controls the voice calls using a communication function selected in response to activation of the multi-function button and in accordance with the monitored status of the voice call.

8. A system as defined in claim 7, wherein the CSIM is separate from the telematics unit.

9. A system as defined in claim 7, wherein the CSIM is separate from the keypad.

* * * * *